United States Patent
Lieker

(10) Patent No.: US 9,855,869 B2
(45) Date of Patent: Jan. 2, 2018

(54) CONTROL VALVE FOR AN AIR SPRING AND MOTOR VEHICLE SEAT HAVING A CONTROL VALVE

(71) Applicant: Isringhausen GmbH & Co. KG, Lemgo (DE)

(72) Inventor: Reiner Lieker, Extertal (DE)

(73) Assignee: ISRINGHAUSEN GMBH & CO. KG, Lemgo (DE)

( * ) Notice: Subject to any disclaimer, the term of this patent is extended or adjusted under 35 U.S.C. 154(b) by 89 days.

(21) Appl. No.: 14/376,267

(22) PCT Filed: Feb. 1, 2013

(86) PCT No.: PCT/EP2013/000330
§ 371 (c)(1),
(2) Date: Aug. 1, 2014

(87) PCT Pub. No.: WO2013/113519
PCT Pub. Date: Aug. 8, 2013

(65) Prior Publication Data
US 2014/0375096 A1    Dec. 25, 2014

(30) Foreign Application Priority Data
Feb. 2, 2012  (DE) .................. 10 2012 00 1990

(51) Int. Cl.
*F16M 13/00*  (2006.01)
*B60N 2/16*  (2006.01)
(Continued)

(52) U.S. Cl.
CPC ......... *B60N 2/1665* (2013.01); *B60N 2/0224* (2013.01); *B60N 2/501* (2013.01);
(Continued)

(58) Field of Classification Search
CPC ...... F16K 17/363; F16K 31/60; F16K 31/122; B60N 2/00
See application file for complete search history.

(56) References Cited

U.S. PATENT DOCUMENTS 3,663,067 A * 5/1972 Yabuta .................... B60T 8/282
                                                        188/349
4,198,025 A  4/1980 Lowe et al.
(Continued)

FOREIGN PATENT DOCUMENTS

CN     2612564     4/2004
DE     2243103 A1  3/1974
(Continued)

OTHER PUBLICATIONS

International Search Report and Written Opinion dated Apr. 17, 2013 by the European Patent Office in counterpart international application No. PCT/EP2013/000330 (with English translation).
(Continued)

*Primary Examiner* — Amy J. Sterling
(74) *Attorney, Agent, or Firm* — Abelman, Frayne & Schwab

(57) ABSTRACT

The invention relates to a control valve (16) for an air spring, comprising a housing (41), an exhaust duct that has an exhaust tappet (26) for opening of closing the exhaust duct, which exhaust tappet interacts with a first control means (19), a ventilation duct that has a ventilation tappet (27) for opening or closing the ventilation duct, which ventilation tappet interacts with a second control means (20), and a supplemental duct having a supplemental tappet (28) for opening or closing the supplemental duct, which supplemental tappet interacts with a third control means (21), wherein a first air connection A connects to the exhaust duct and a second air connection P connects to the exhaust duct together with the supplemental duct, wherein a first control
(Continued)

Figure 1:
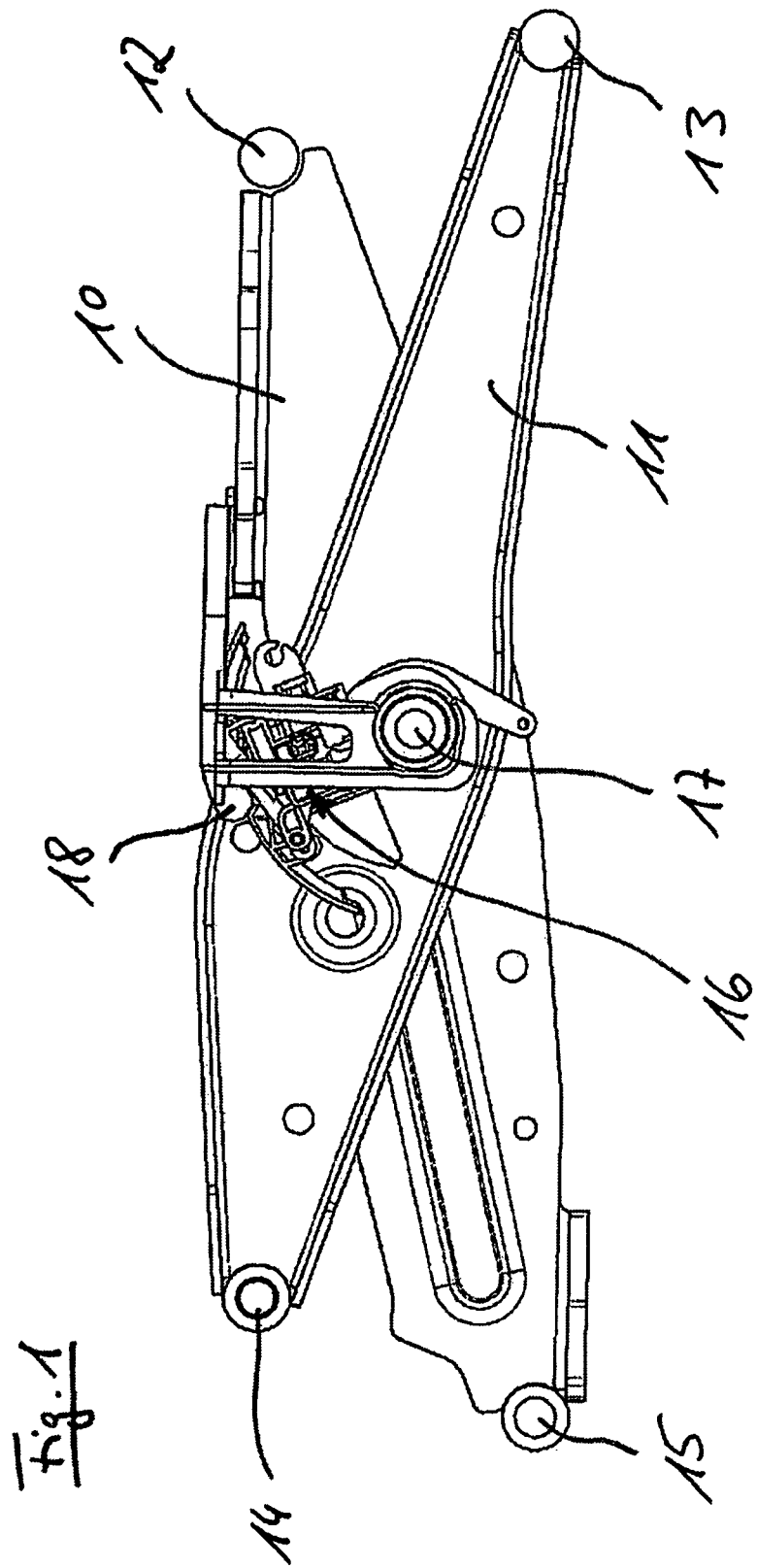

means (19) and a second control means (20) are arranged to one another in such a manner that said control means cannot be actuated at the same time by an control element (18), and wherein the second control means (20) and the third control means (21) are arranged to one another in such a manner that the supplemental duct can only be opened when the ventilation duct is opened. The invention further relates to a motor vehicle seat comprising a mechanical swing system and an air spring, which motor vehicle seat has such a control valve.

13 Claims, 8 Drawing Sheets

(51) Int. Cl.
  *B60N 2/50* (2006.01)
  *B60N 2/52* (2006.01)
  *B60N 2/02* (2006.01)
  *F16K 17/36* (2006.01)
  *F16K 31/60* (2006.01)
(52) U.S. Cl.
  CPC ............ *B60N 2/502* (2013.01); *B60N 2/505* (2013.01); *B60N 2/508* (2013.01); *B60N 2/525* (2013.01); *F16K 17/363* (2013.01); *F16K 31/602* (2013.01)

(56) References Cited

U.S. PATENT DOCUMENTS

| | | | |
|---|---|---|---|
| 4,325,407 A * | 4/1982 | Weiler | B60T 11/34 137/493.2 |
| 5,735,509 A | 4/1998 | Gryp et al. | |
| 6,616,116 B1 | 9/2003 | Rochau et al. | |
| 7,770,974 B2 | 8/2010 | Ott et al. | |
| 7,934,708 B2 | 5/2011 | Haller | |
| 2003/0000587 A1* | 1/2003 | Sulzye | B60G 17/0523 137/636.1 |
| 2008/0150202 A1 | 6/2008 | Haller | |
| 2008/0197684 A1 | 8/2008 | Ott et al. | |
| 2009/0050220 A1 | 2/2009 | Kang | |

FOREIGN PATENT DOCUMENTS

| | | |
|---|---|---|
| DE | 7835259 U1 | 5/1979 |
| DE | 19705010 A1 | 8/1997 |
| DE | 102006058441 | 4/2008 |
| DE | 102006058441 B3 | 4/2008 |
| DE | 102007012399 | 8/2008 |
| EP | 1165345 B1 | 3/2000 |
| EP | 1165345 A1 | 1/2002 |
| EP | 1935711 A1 | 6/2008 |
| WO | WO 2000/58125 A1 | 10/2000 |
| WO | WO0058125 A1 | 10/2000 |
| WO | WO 2008/067977 A1 | 6/2008 |
| WO | WO2008067977 A1 | 6/2008 |

OTHER PUBLICATIONS

Examination Report dated Nov. 27, 2012 by the German Patent Office in priority German application No. 102012001990.4, filed Feb. 2, 2012 in the German Patent Office.

International Search Report and Written Opinion dated Apr. 17, 2013 by the European Patent Office in counterpart application No. PCT/EP2013/000330 with English translation.

* cited by examiner

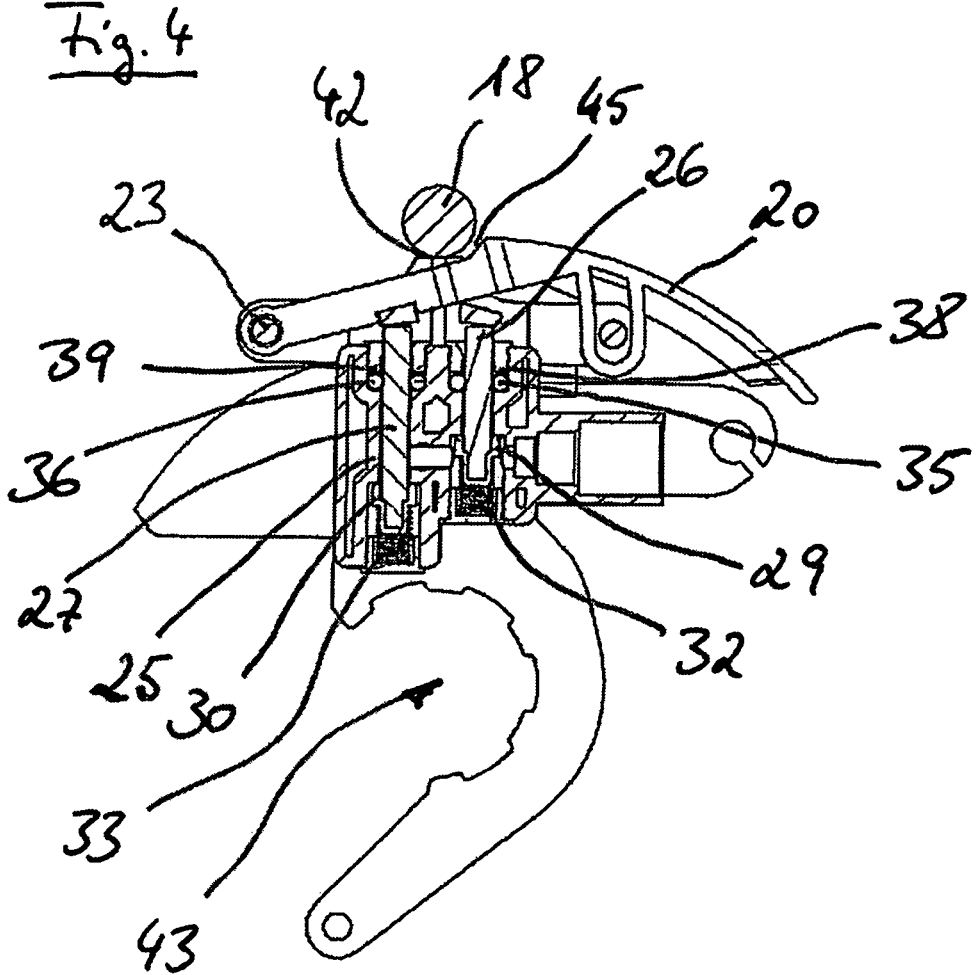

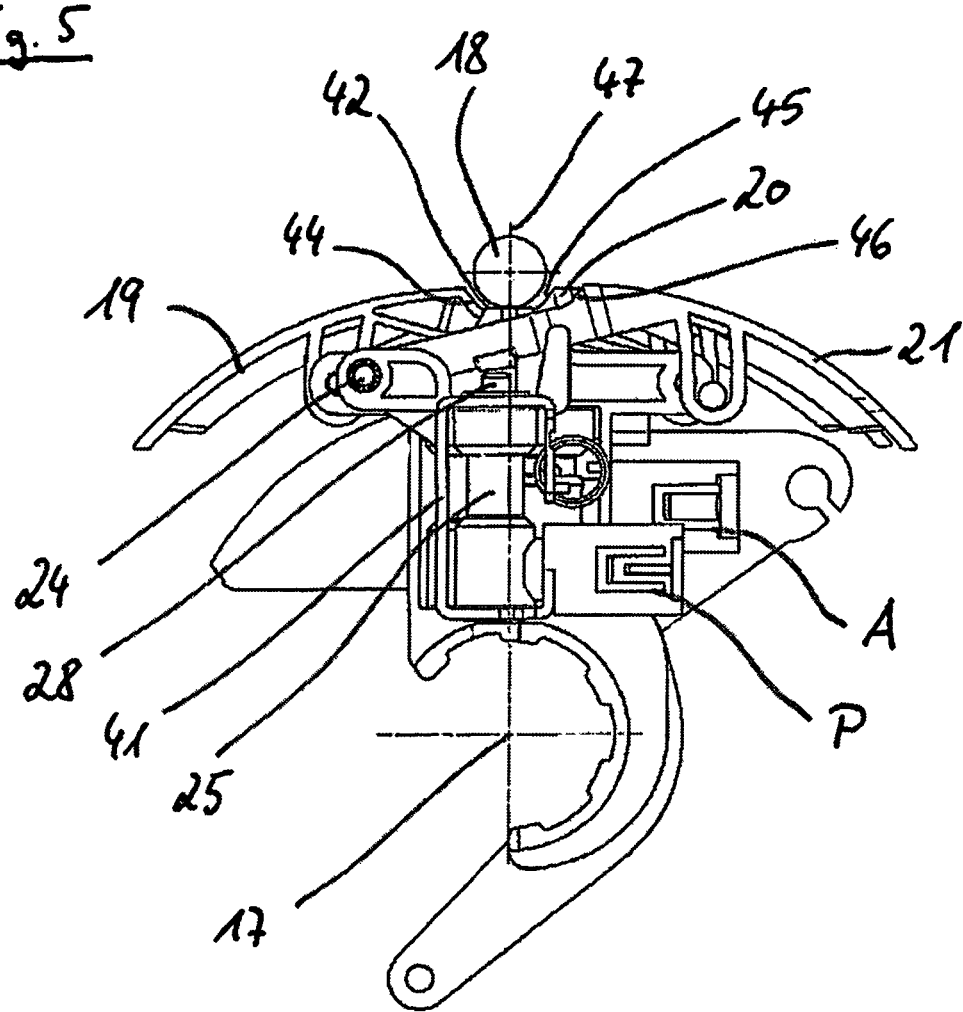

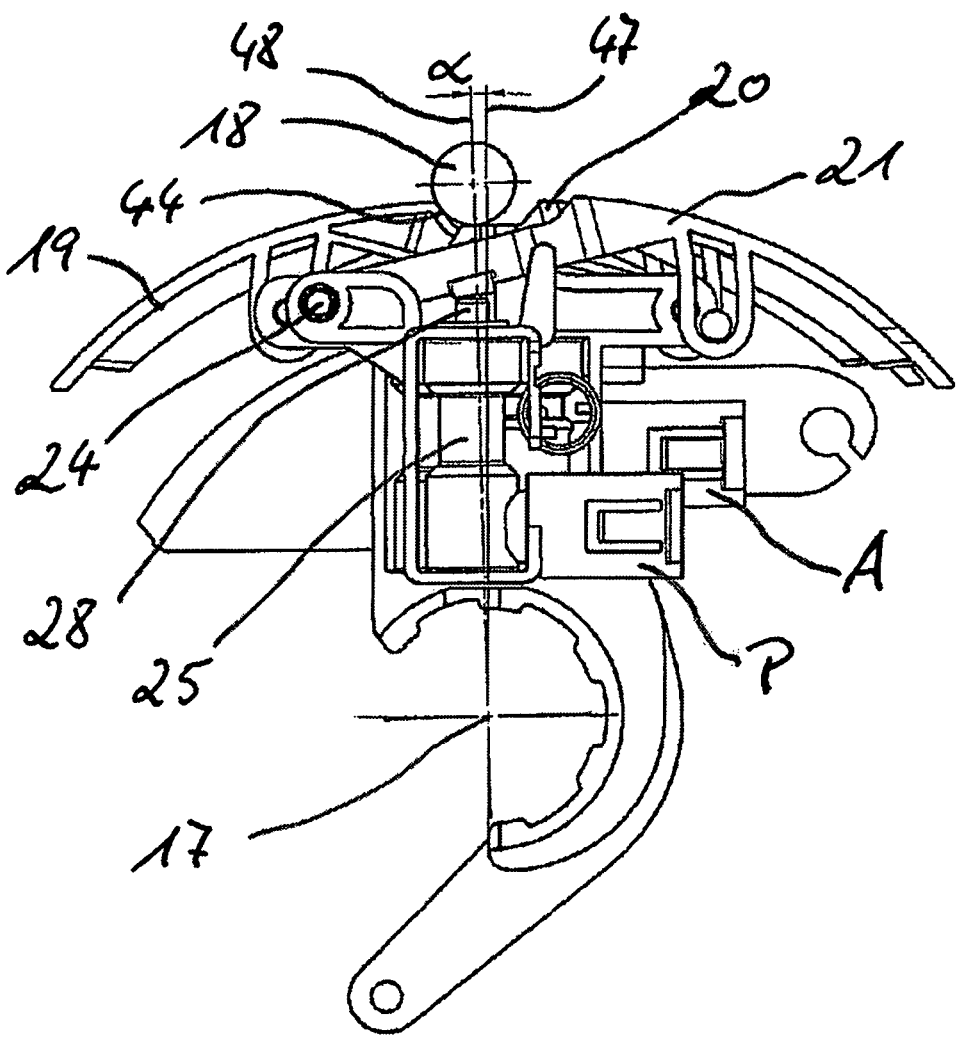

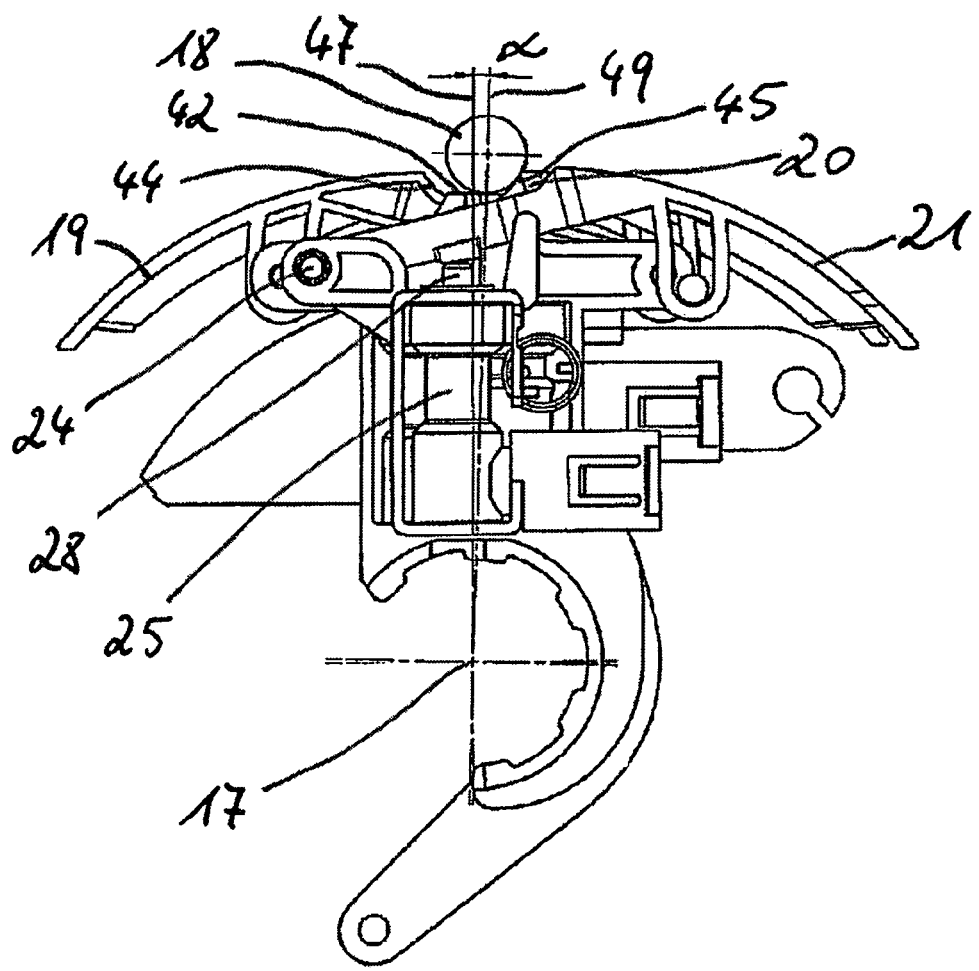

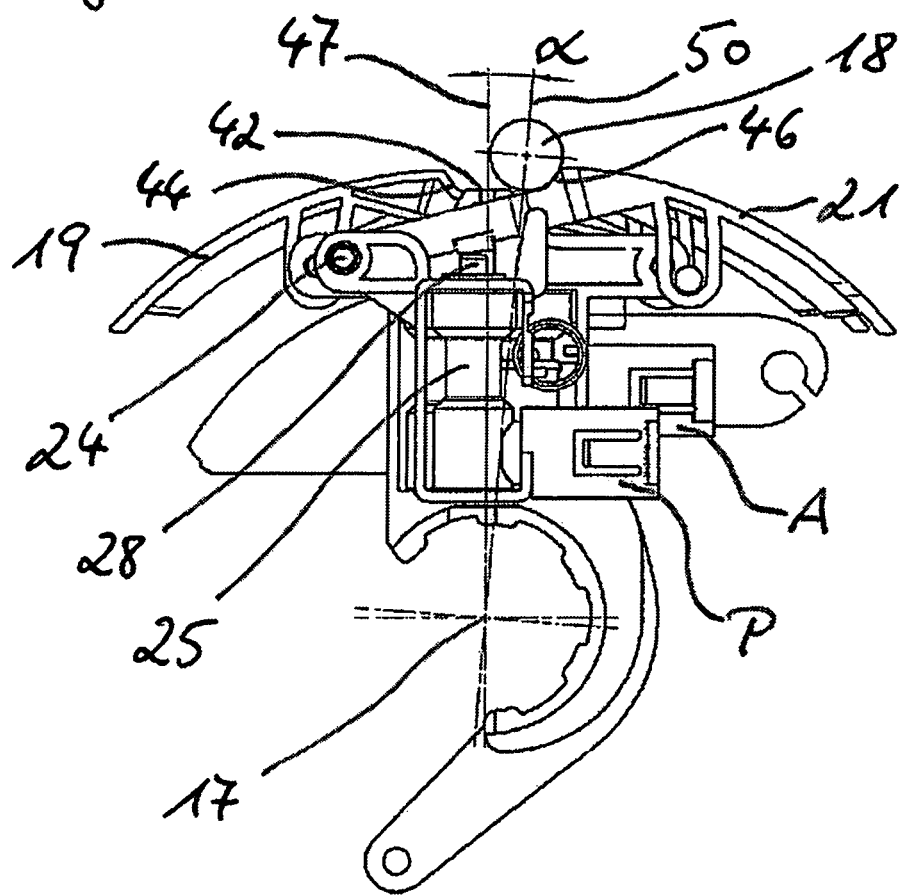

CONTROL VALVE FOR AN AIR SPRING AND MOTOR VEHICLE SEAT HAVING A CONTROL VALVE

CROSS-REFERENCE TO RELATED APPLICATIONS

This is a 371 of PCT/EP2013/000330 filed Feb. 1, 2013, which claims priority to German Patent Application No. DE 10 2012 001 990.4 filed Feb. 2, 2012, the disclosures of which are incorporated by reference herein and made a part of this application.

The invention relates to a control valve for an air spring and to a motor vehicle seat with a mechanical swing system and an air spring which has a control valve.

In commercial vehicles, motor vehicle seats are known which are equipped with a scissor-type swing system that can swing and is height-adjustable. Such a scissor-type swing system includes at least one air spring and a pair of scissor control arms. The scissor control arms are arranged so that they can swing relative to each other by means of a common scissor axle. A control device serves for height setting and for height regulation of the scissor-type swing system. It comprises a control valve for controlling the processes of supplying air to and venting air from the air spring. The control valve is actuated by a drive pin which acts on control levers arranged on the control valve. The height setting has an integrated height regulation which ensures that the central position of the swing movement, corresponding to the occupant's preferred height set individually according to comfort factors, is retained. From EP 1 165 345 B1, such a motor vehicle seat is known which has, as valve device, a control valve with two tappets which are operated by means of a magnet arranged on a control lever. The control lever can adopt three positions: In its central, neutral position, the magnet acts on neither of the tappets, with the result that the control valve is closed. If the control lever is swung by a drive pin which is arranged on one of the scissor control arms, this can take place either in one direction or in the other. In one direction the magnet is then over one tappet in its venting position, wherein the associated tappet is operated; in its other position, the air-supply position, the magnet is above the other tappet and brings about a supply of air to the air spring from a compressed-air tank. However, in such a valve device the response behaviour of the height regulation is not optimal as regards sensitivity and speed as well as the fine graduations of the static height setting.

The object of the invention is therefore to provide a control valve for an air spring as well as a motor vehicle seat with a mechanical swing system and a control valve which have a better response behaviour of a height regulation as regards sensitivity, speed and the fine graduations of the static height setting.

The object is achieved by a control valve with the features of claim 1. Because the control valve has a total of three tappets which can close or open a venting channel, an air-supply channel and an additional channel for air supply respectively, a faster supply of air to the air spring can take place using a channel which is open in addition to the air-supply channel. Because the first and second control means, which operate the vent tappet and the air-supply tappet respectively, are arranged relative to each other such that they cannot be actuated simultaneously by an operating element, an undesired simultaneous supply of air to and venting of air from the air spring cannot take place. Operating the air-supply tappet and the additional tappet one after the other in time makes it possible already to allow an earlier response, as the full channel cross section that results from the air-supply channel plus the additional channel is not immediately completely opened during the supply of air, but first only the air-supply channel is opened during a small relative movement of the operating element towards the housing of the control valve, and the additional channel is additionally opened only during a larger relative movement.

An advantageous development of the invention provides that the three control means are arranged on the housing. The tolerances are thereby reduced compared with fixings to other constituents of a motor vehicle seat, which leads to a more precise control of a height regulation of a motor vehicle seat.

A further advantageous development of the invention provides that the control means are control levers which rotate in each case about a swivel pin formed on the housing. In contrast to drag levers or cam discs which are used in the state of the art, for example DE 10 2006 017 774 A1 or DE 10 2008 013 794 B3, this also serves to reduce the tolerances and thus for a more precise control of the height regulation.

A further advantageous development of the invention provides that the vent tappet and/or the air-supply tappet and/or the additional tappet are formed in one piece. Again, this also serves to reduce the tolerances and in addition to prevent an idle stroke. Again, this also results in a more precise control of the height regulation being obtained.

A further advantageous development of the invention provides that each tappet is pressed into its closed position by one allocated spring in each case. Each channel is thereby kept closed in the neutral position by simple means and an opening of the respective channel always takes place only against the spring force during operation of the respective control lever by means of the operating element.

A further advantageous development of the invention provides that the vent tappet, the air-supply tappet and the additional tappet each have a valve seat, wherein at least one of the valve seats is injection-moulded from a plastic, around the associated tappet. On the one hand, such an overmoulded tappet is easy to produce and, on the other hand, it is subject to less wear than the other known embodiments.

A further advantageous development of the invention provides that at least one of the tappets is allocated a sealing ring inside a guiding device, which sealing ring is arranged stationary in the housing and in which the allocated tappet moves. The wear of the sealing ring is reduced by such a stationary arrangement of the sealing ring in the housing instead of on the tappet. It is thereby possible to produce valves which do not have to be serviced over their entire lifetime. In addition, the stationary arrangement of the sealing rings in the housing prevents a suction effect from occurring.

A further advantageous development of the invention provides that at least one of the tappets has, in the housing, an allocated guiding device which has a lubricant reservoir. On the one hand, the lubricant reservoir prevents dirt from getting into the control valve and thus from being able to result in wear or a malfunction. On the other hand, it is thereby achieved that there is no need for additional lubrication over the entire lifetime of the valve. Such a valve is thus maintenance-free.

The object is also achieved by a motor vehicle seat with the features of claim 9. As such a motor vehicle seat contains the control valve according to the invention, the above statements regarding the control valve with the respective embodiments and the advantages resulting from them also apply to the motor vehicle seat according to the invention.

The four defined positions of the operating element for the control valve, namely the neutral position, the venting position, the air-supply position and the additional position, correspond to the states specified above for the control valve, in which the control valve is located, namely in the closed state, in the vented state, in the air-supplied state or in the air-supplied state with additional channel.

An advantageous development of the invention provides that the control valve is arranged on a spindle, rotatable relative thereto, which connects two scissor control arms of the mechanical swing system rotatably to each other and the operating element is arranged stationary on one of the scissor control arms. It is thereby possible, in a simple manner, to keep the control valve always in the same relative position with respect to the operating element by co-rotation, when the seat height is altered, with the scissor control arm to which the operating element is attached. This makes it possible to carry out very precise and delicate control of the height regulation by altering the relative position of the control valve with respect to the operating element, by actively rotating the control valve to a greater or lesser extent than the scissor control arm.

A further advantageous development of the invention provides that the operating element is a drive pin which, in its neutral position, is pressed under pre-tension against a bearing surface of the housing of the control valve. Tolerances with respect to the position of the operating element relative to the control valve and the bearing surface formed on the housing, which can occur during a swivel movement of the scissor control arm, are thereby compensated. Thus, the operating element is thereby always guaranteed to rest against the control valve.

A further advantageous development of the invention provides that the angle, relative to the spindle, between the venting position and the neutral position of the operating element is at most 5°, preferably 1.2°, and/or the angle between the air-supply position and the neutral position is at most 4°, preferably 1.2°, and/or the angle between the additional position and the neutral position is at most 7°, preferably 5°. It is thereby possible that the height regulation already starts with very small relative movements between operating element and control valve, unlike what was the case in the state of the art, where an angle of approx. 7°—also contingent on the larger tolerances in these control valves—was routinely necessary in order to allow the regulation to start.

A further advantageous development of the invention provides that the operating element can be adjusted between its positions using a cable pull and it is used to fix the static height of the motor vehicle seat. This represents a very simple and robust manner of carrying out the required settings.

Figure 2:
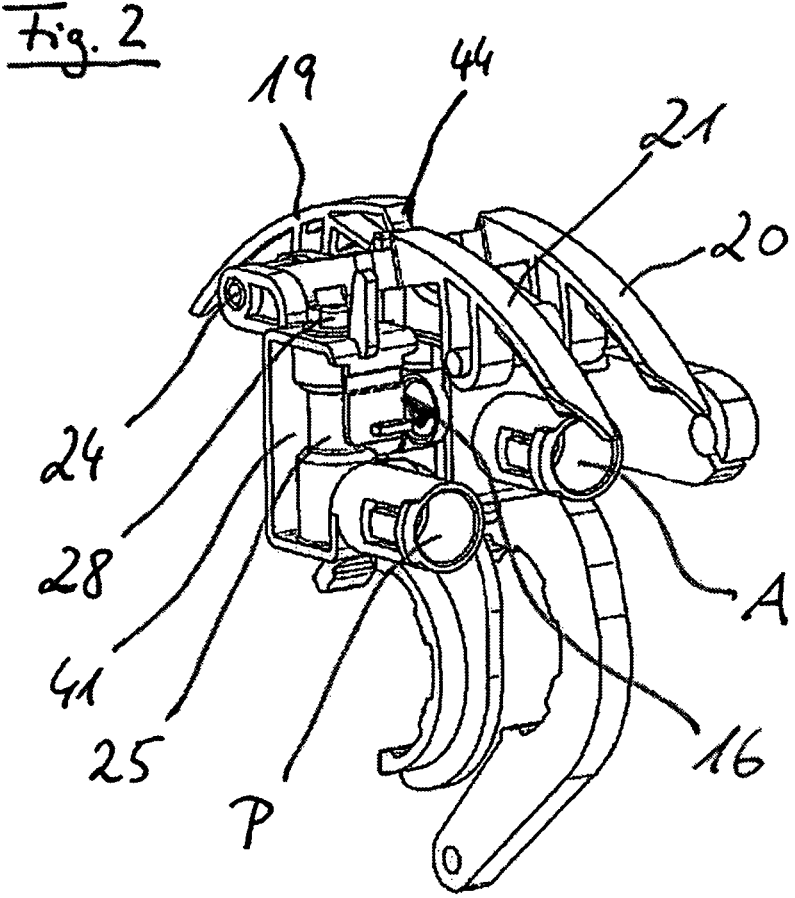
Figure 3:
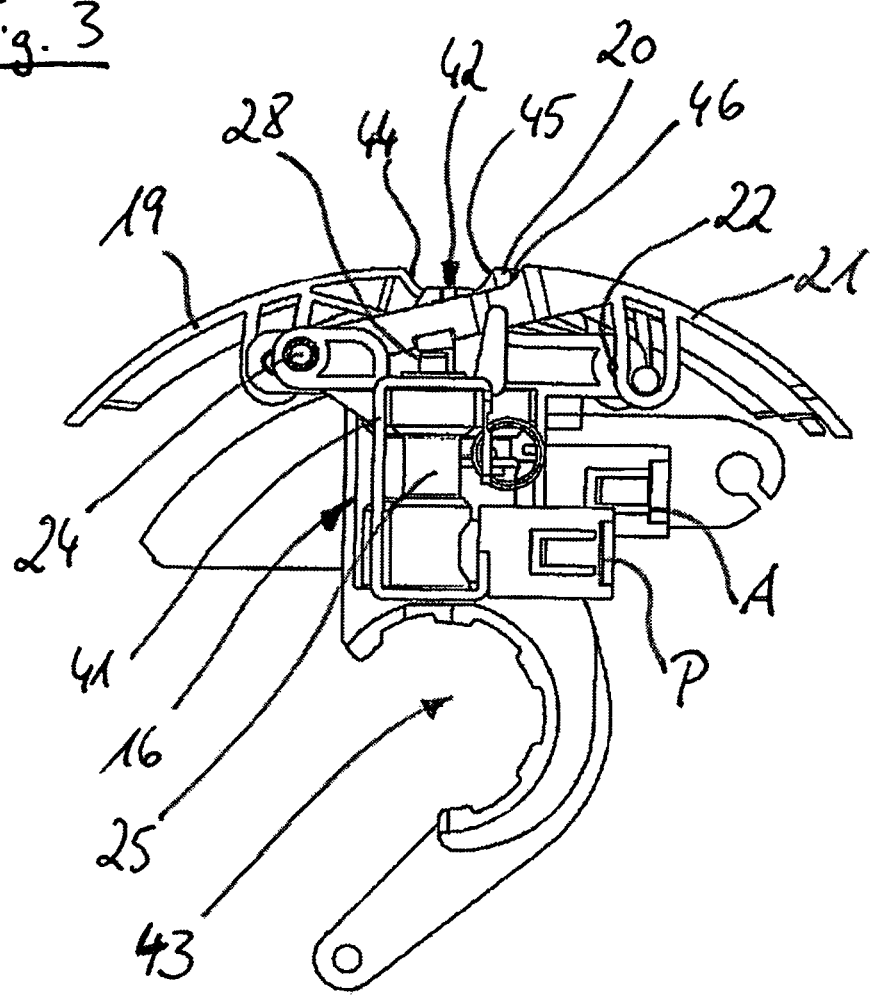

Further advantages and details of the invention are described below with reference to the embodiment example represented in the figures. There are shown in:

FIG. 1 a scissor control arm system with a control valve according to the invention, FIG. 2 an enlarged, perspective representation of the control valve from FIG. 1, FIG. 3 an enlarged side view of the control valve according to the invention from the same direction as represented in FIG. 1, FIG. 4 a longitudinal section through a control valve according to the invention in a plane parallel to FIG. 3, FIG. 5 a view of the control valve according to FIG. 3 with an operating element in its neutral position, FIG. 6 a view like FIG. 5, but with the operating element in its venting position, FIG. 7 a representation like FIG. 5, but with the operating element in its air-supply position, and FIG. 8 a representation as in FIG. 7, but with the operating element in its additional position.

A side view of a part of a swing system of an air-sprung motor vehicle seat is represented in FIG. 1. The basic structure of such a swing system which additionally has a height setting and a height regulation of the seating surface of a motor vehicle seat is known in principle. Therefore, only the constituents that are essential with respect to the design of the invention will be discussed below.

FIG. 1 shows one of the two pairs of scissor control arms arranged parallel to each other with an inner scissor control arm 10 and an outer scissor control arm 11. The two scissor control arms 10, 11 are connected to each other rotatably via a spindle 17. At their right-hand ends represented in FIG. 1 they each have a fixed bearing 12, 13, which is locally fixed on the top frame (not shown) and on the bottom frame (likewise not shown) respectively. At the respective left-hand ends of the scissor control arms 10, 11, a horizontal slide bearing 14, 15 is formed in each case. By means of such a scissor control arm system which is provided once again on the other side of a motor vehicle seat (not shown) in basically the same design, an adjustment of the height of the top frame relative to the bottom frame, and thus of the seat height, is possible. Between the top frame and the bottom frame, an air spring (not shown) and routinely also a shock absorber (likewise not shown) are arranged.

The (static) seat height setting and the activation-dependent height regulation are achieved in that either air is removed from the air spring or air is supplied to it from a reservoir (not shown). The amounts of air removed from or supplied to the air spring also depend on the weight of the occupant of the motor vehicle seat, among other things. The control of when and how much air is removed from the air spring (venting) and supplied to the air spring (supply of air) takes place by means of a control valve 16. The basic mode of operation of a control valve 16 is known, and therefore only the features essential to the invention that are changed compared with the state of the art need to be discussed below.

A control valve 16 according to the invention—which is shown in detail in FIGS. 2-8 and also described in detail below—is arranged rotatable on the spindle 17. The control, explained in even more detail below, of the control valve 16 takes place via a relative movement of an operating element 18—this is called drive pin 18 below in accordance with the embodiment example represented in the figures, wherein other designs are also possible in other embodiment examples—with respect to the control valve 16. The drive pin 18 is securely connected to the outer scissor control arm 11 and projects therefrom substantially parallel to the spindle 17 in the direction in which the control valve 16 is also arranged on the spindle 17.

The seat height is routinely set in the non-activated state of the swing system depending on the weight of the occupant in that the control valve 16 is rotated about the spindle 17 by means of a Bowden cable (not shown) and a supply of air to or venting of air from the air spring, described in even more detail below, is thereby achieved because of the relative movement with respect to the drive pin 18, until the seat height desired by the occupant is set. When this state is achieved, the control valve 16 is positioned relative to the drive pin 18 such that the latter is located in its neutral position 47 represented in FIG. 5 and the control valve 16 is closed.

The structure of the control valve 16 is described below with reference to a combination of FIGS. 2 and 3 without the drive pin 18—this is represented in FIGS. 4-8. These two figures only reproduce two different directions of view. In FIGS. 2-8 the control valve 16 is rotated clockwise relative to the representation thereof in FIG. 1 until its bearing surface 42 lies at the top and runs horizontally.

The control valve 16 has three tappets 26, 27, 28 running substantially vertically in FIGS. 2 and 3. Because of the viewing directions, only the upper end, protruding from the outer wall 25, of one of the tappets, namely the additional tappet 28, can be seen in FIGS. 2 and 3. The other two tappets, namely the vent tappet 26 and the air-supply tappet 27 can be seen in the sectional drawing of FIG. 4.

Each of the tappets 26, 27, 28 is actuated by a respectively allocated control lever 19, 20, 21. Instead of the specific design of the embodiment example as control lever 19, 20, 21, these parts generally to be called control means 19, 20, 21 can also be formed in another way, for example as a rocker, slide or roller.

Each of the control levers 19, 20, 21 is connected directly to the housing 41, which also comprises the outer wall 25 of each individual tappet 26, 27, 28 as a constituent, and can be moved downwards about a swivel pin 22, 23, 24 running horizontally in each case. During a movement of a control lever 19, 20, 21 downwards, the respectively allocated tappet 26, 27, 28 is pressed downwards. The three control levers 19, 20, 21 are a vent lever 19 pointing to the left in FIG. 3 and two control levers 20, 21 pointing to the right which are responsible for supplying air to the air spring. The air-supply lever 20 located further behind in FIG. 3 is shifted slightly to the left compared with the additional lever 21.

Each of the control levers 19, 20, 21 has respectively a release slope 44, 45, 46 running steeply, diagonally upwards. A horizontally running bearing surface 42 is formed between the release slope 44 of the vent lever 19 and the release slope 45 of the air-supply lever 20. In the case of the two control levers 20, 21 responsible for supplying air to the air spring, the release slope 45 of the air-supply lever 20 is arranged closer to the bearing surface 42 than the release slope 46 of the additional lever 21.

In the lower area of the outer wall 25 of the additional tappet 28 there is a connection P for a compressed-air line (not shown) which comes from a compressed-air supply tank (not shown). In the lower area of the outer wall 25 of the vent tappet 26 there is a connection A for a compressed-air line (not shown) for the air spring.

Underneath the outer wall 25 of the additional tappet 28, a spindle mount 43 is formed which serves to clip the control valve 16 according to the invention onto the spindle 17 (see FIG. 1 as well as FIGS. 5-8), wherein the entire control valve 16, however, is still rotatable relative to the spindle 17.

FIG. 4 shows a longitudinal section in a plane which is parallel to the image plane represented in FIG. 3. The section runs between the air-supply lever 20 and the vent lever 19, with the result that only the air-supply lever 20 is shown.

The air-supply lever 20 is connected at its left-hand end to the housing 41 of the control valve 16 via a swivel pin 23 and can be rotated clockwise downwards about this swivel pin 23. If the air-supply lever 20 is pressed downwards, this presses, by means of a suitable surface, on the upper end of the air-supply tappet 27, which is pressed downwards against a closing spring 33 arranged at the lower end of the outer wall 25, with the result that a valve seat 30 located in its lower end area is moved downwards. This is the case when the drive pin 18 goes beyond the position, explained in even more detail below with reference to FIG. 7, to the right with respect to the release slope 45 of the air-supply lever 20. In the process, a channel is opened which allows the compressed air available at the connection P and coming from a reservoir to flow into the air spring via a compressed-air line at the connection A, with the result that the air spring is supplied with air.

The air-supply tappet 27 is manufactured, like the other two tappets 26, 28, in one piece from a steel. Alternatively, the tappets 26, 27, 28 could also consist of any material which has good wear properties in the case of material pairing, such as for example polyoxymethylene (POM), aluminium or brass. The valve seats 29, 30, 31 are injection-moulded from a plastic, such as for example from an elastomer, in particular from a thermoplastic elastomer and directly around the lower end of the respective tappet 26, 27, 28, or alternatively also mounted. Cut-off bodies that are easy to produce and which additionally have even less play compared with the multi-part tappets known in the state of the art are thereby obtained. The following is a non-exhaustive list of the elastomers that can be used: polyurethane (PUR), fluorine rubber (FPM), nitrile-butadiene rubber (NBR), hydrogenated nitrile rubber (HNBR) and ethylene-propylene-diene rubber (EPDM).

A sealing ring 26 surrounding the air-supply tappet 27 is arranged stationary in the housing 41 in the upper area. This is an O-ring made of an elastomer. Above this sealing ring 26 there is a lubricant reservoir 39 in the form of a grease pocket. It is thereby brought about that no dirt can get into the valve.

The part additionally shown in FIG. 4 which receives the vent tappet 26 inside the housing 41 is constructed substantially identically in terms of functionality: It contains a closing spring 32, a one-piece vent tappet 26 which has a valve seat 29 injection-moulded around its lower area—alternatively the valve seat 29 can also be mounted—and, in the upper area of the guide, a sealing ring 35 in the form of an O-ring, surrounding the vent tappet 26. In addition there is a lubricant reservoir 38. Of the vent lever 19 operating the vent tappet 26, only the surface which presses the vent tappet 26 downwards when actuated can be seen in section.

Because of the one-piece nature of the tappets 26, 27, 28, lower tolerances are achieved and an idle stroke is prevented. Lower tolerances are also achieved in that the control levers 19, 20, 21 are arranged over the swivel pins 22, 23, 24 directly on the housing 41 of the control valve 16. The valve seats 29, 30, 31 have a small cross section, in order to keep the actuating forces low. As the sealing rings 35, 36, 37 are arranged stationary in the housing 41 and not movable relative thereto on the tappets 26, 27, 28, a suction effect is prevented. The tappets 26, 27, 28 have, in the surfaces touching the sealing rings 35, 36, 37, a very smooth surface, with the result that only extremely small friction forces occur.

During a movement of the vent tappet 26 downwards by actuation of the vent lever 19 (see FIG. 6) a channel is opened to the atmosphere. As this part of the control valve 16 is connected to the air spring via the connection A, air escapes from the air spring into the atmosphere when the vent lever 19 is pressed.

The drive pin 18 securely arranged on the outer scissor control arm 11 (see FIG. 1) rests against the bearing surface 42 of the housing 41 of the control valve 16, against a pre-tension. It is thereby possible to compensate tolerances which can occur during an alteration of the angles of the two scissor control arms 10, 11 relative to each other—during an alteration of the seat height—between the control valve 16 which is clipped onto the spindle 17 and the drive pin 18 formed stationary on the scissor control arm 11 of the outer scissor.

FIGS. 5-8 show the control valve 16 in four different states which are described individually below.

FIG. 5 shows the control valve 16 in its closed position. Here, the drive pin 18 is located in contact (as stated above, against a pre-tension) with the bearing surface 42 on the housing 41 of the control valve 16. Thus none of the control levers 19, 20, 21 is pressed and all channels of the control valve 16 are closed, with the result that compressed air from the supply tank can neither get into the air spring nor can compressed air escape therefrom into the atmosphere. The drive pin 18 is thus located in its neutral position 47, which is defined in that the vertically-running spindle represented in the figure, which runs through the centre of the drive pin 18 and the centre of the spindle 17 is arranged centrally over the bearing surface 42 and at an approximately equal distance from the release slopes 44, 45 of the vent lever 19 and of the air-supply lever 20 respectively.

In FIG. 6 the control valve 16 is represented in a position from which a venting of the air spring takes place. The drive pin 18 has been shifted to the left compared with the neutral position 47 in FIG. 5. It butts with its left-hand lower surface against the release slope 44 of the vent lever 19. Its venting position 48 is defined by the centre of the drive pin 18 in this position and the spindle 17. Thus an angle α is produced between the neutral position 47 and the venting position 48. In the control valve 16 according to the invention, this is only 1.2°. This means that during a further movement of the drive pin 18 relative to the control valve 16 to the left the vent lever 19 is pressed downwards, and the vent tappet 26 (see FIG. 4) is thereby also pressed downwards, with the result that the venting already described above takes place via the connection A of the air spring into the atmosphere. In contrast to the control valves known from the state of the art, there is a significant difference as regards the start of the venting, which first starts in the state of the art at approximately 7°. A faster response, and thus a finer gradation and higher switching precision as well as a significantly higher switching frequency, is thus achieved.

This applies correspondingly to a movement of the drive pin 18 in the other direction, i.e. to the right, as represented in FIG. 7. Here, the drive pin 18 rests with its lower right-hand surface against the release slope 45 of the air-supply lever 20. The angle α between the neutral position 47 and the air-supply position 49, which is defined analogously to the venting position 48 according to FIG. 6, is likewise only 1.2° as compared with the state of the art at 7° for the start of a supply of air to the air spring. If the drive pin 18 is moved further to the right beyond the air-supply position 49 represented in FIG. 7, it presses the air-supply lever 20 downwards, with the result that the air-supply tappet 27 (see FIG. 4) is pressed downwards. The supply of air to the air spring, already described above, via the compressed air available at the connection P from a supply tank is thereby released via an air-supply channel opened inside the control valve 16 and the connection A to the air spring.

If the drive pin 18 has been moved, relative to the control valve 16, so far to the right that the position represented in FIG. 8 is reached, the drive pin 18 butts with its right-hand lower surface against the release slope 46 of the additional lever 21. In the process it furthermore presses the air-supply lever 20 completely downwards, with the result that the air-supply channel—as described above with reference to FIG. 7—is furthermore fully opened. This position of the drive pin 18, represented in FIG. 8, defines its additional position 50. In the control valve 16 according to the invention the angle α between the neutral position 47 and the additional position 50 at 5° is reached. Here too, the additional position 50 is defined like the venting position 48.

If the drive pin 18 is moved still further to the right, it presses the additional lever 21 downwards, with the result that the additional tappet 28 is pressed downwards in addition to the vent lever 27 still located in its lower position. This has the effect that an additional channel is released, which results in a wider cross section of the now opened compressed air supply to the air spring. A faster supply of air to the air spring thus occurs, whereby the seating surface is moved upwards faster. This is advantageous in the case of a strong activation, as the time for reaching the seat height pre-selected by the occupant in the non-activated state can then be achieved more quickly.

Overall, a faster response, and thus a finer gradation and higher switching precision, including the accompanying higher adjustment speed with large adjustment travels or large cycle strokes as well as a significantly higher switching frequency, are achieved by the invention.

In fact, a mechanical setting device, for example the previously described Bowden cable, is usually used in the non-activated state for setting the seat height. The control valve 16 according to the invention and the motor vehicle seat according to the invention can be operated just as well with a height setting by means of an electric motor or other control drives, such as for example hydraulic or pneumatic cylinders. The fixing of the static height can thus be set with the aid of electric, pneumatic or hydraulic auxiliary energy of a suitable actuator.

LIST OF REFERENCE NUMBERS

10, 11 scissor control arm
12, 13 fixed bearing
14, 15 horizontal slide bearing
16 control valve
17 spindle
18 operating element, drive pin
19 first control means, vent lever
20 second control means, air-supply lever
21 third control means, additional lever
22, 23, 24 swivel pin
25 outer wall
26 vent tappet
27 air-supply tappet
28 additional tappet
29, 30, 31 valve seat
32, 33, 34 closing spring
35, 36, 37 sealing ring
38, 39, 40 lubricant reservoir
41 housing
42 bearing surface
43 spindle mount
44, 45, 46 release slope
47 neutral position
48 venting position
49 air-supply position
50 additional position
A connection for air spring, first air connection
P connection for compressed air, second air connection
α angle between neutral and effective position

The invention claimed is:

1. Control valve (16) for an air spring with a housing (41), with a venting channel which has a vent tappet (26) for opening or closing the venting channel which interacts with a first control means (19), with an air-supply channel which has an air-supply tappet (27) for opening or closing the air-supply channel which interacts with a second control means (20), and with an additional channel which has an additional tappet (28) for opening or closing the additional channel which interacts with a third control means (21), wherein a first air connection (A) is connected to the venting channel and a second air connection (P) is connected to the air-supply channel together with the additional channel, and
   an operating element (18) movable in a first and second direction, wherein the operating element (18) is operatively connected to the first control means (19), to the second control means (20), and to the third control means (21), and wherein the operating element (18) acts on the first control means (19) and opens the vent tappet (26) when moved in the first direction, and wherein the operating element (18) acts on the second control means (20) and opens the air supply tappet (26) when moved in a first predetermined distance in the second direction, and wherein the operating element (18) acts on the third control means (21) and opens the additional tappet (28) when moved a second predetermined distance in the second direction; and
   wherein the first control means (19) and the second control means (20) are arranged relative to each other such that they cannot be actuated simultaneously by an operating element (18), and wherein the second control means (20) and the third control means (21) are arranged relative to each other such that the additional channel can only be opened when the air-supply channel is opened.

2. Control valve (16) according to claim 1, characterized in that the three control means (19, 20, 21) are arranged on the housing (41).

3. Control valve (16) according to claim 2, characterized in that the control means (19, 20, 21) are control levers which rotate in each case about a swivel pin (22, 23, 24) formed on the housing (41).

4. Control valve (16) according to claim 3, characterized in that the vent tappet (26) and/or the air-supply tappet (27) and/or the additional tappet (28) are formed in one piece.

5. Control valve (16) according to claim 4, characterized in that each tappet (26, 27, 28) is pressed into its closed position by one allocated spring (32, 33, 34) in each case.

6. Control valve (16) according to claim 5, characterized in that the vent tappet (26), the air-supply tappet (27) and the additional tappet (28) each have a valve seat (29, 30, 31), wherein at least one of the valve seats (29, 30, 31) is injection-moulded from a plastic, around the associated tappet (26, 27, 28).

7. Control valve (16) according to claim 6, characterized in that at least one of the tappets (26, 27, 28) is allocated a sealing ring (35, 36, 37) inside a guiding device, which sealing ring is arranged stationary in the housing (41) and in which the allocated tappet (26, 27, 28) moves.

8. Control valve (16) according to claim 7, characterized in that at least one of the tappets (26, 27, 28) has, in the housing, an allocated guiding device which has a lubricant reservoir (38, 39, 40).

9. A motor vehicle seat, comprising:
   stationary and height-variable parts;
   a mechanical swing system for a weight-independent setting a static seat height;
   an air spring arranged between the stationary and height-variable seat parts; and
   a control valve (16) for the air spring with a housing (41), with a venting channel which has a vent tappet (26) for opening or closing the venting channel which interacts with a first control means (19), with an air-supply channel which has an air-supply tappet (27) for opening or closing the air-supply channel which interacts with a second control means (20), and with an additional channel which has an additional tappet (28) for opening or closing the additional channel which interacts with a third control means (21), wherein a first air connection (A) is connected to the venting channel and a second air connection (P) is connected to the air-supply channel together with the additional channel, and
   an operating element (18) movable in a first and second direction, wherein the operating element (18) is operatively connected to the first control means (19), to the second control means (20), and to the third control means (21), and wherein the operating element (18) acts on the first control means (19) and opens the vent tappet (26) when moved in the first direction, and wherein the operating element (18) acts on the second control means (20) and opens the air supply tappet (26) when moved in a first predetermined distance in the second direction, and wherein the operating element (18) acts on the third control means (21) and opens the additional tappet (28) when moved a second predetermined distance in the second direction; and
   wherein the first control means (19) and the second control means (20) are arranged relative to each other such that they cannot be actuated simultaneously by an operating element (18), and wherein the second control means (20) and the third control means (21) are arranged relative to each other such that the additional channel can only be opened when the air-supply channel is opened,
   wherein the operating element (18) of the control valve is arranged on the height-variable seat part movable relative to the stationary part, the operating element (18) having a neutral position (47) in which all of the channels of the control valve (16) are closed, a venting position (48) in which it operates the first control means (19) and the venting channel is opened, has an air-supply position (49) in which it operates the second control means (20) and the air-supply channel is opened, and has an additional position (50) in which it operates the second control means (20) and the third control means (21), and the air-supply channel and the additional channel are opened.

10. A motor vehicle sent according to claim 9, wherein the mechanical swing system has two scissor control arms (10, 11), a spindle (17) for connecting the two scissor control arms (10, 11) rotatably relative each other, and
    wherein the operating element (18) of the control valve (16) is stationary arranged on one of the two scissor control arms.

11. Motor vehicle seat according to claim 10, wherein the operating element (18) is a drive pin which, in neutral position (47) thereof, is pressed under pre-tension against a bearing surface (42) of the housing (41) of the control valve (16).

12. Motor vehicle seat according to claim 10, wherein the angle (a), relative to the spindle, between the venting position (48) and the neutral position (47) of the operating element (18) is at most 5°, and/or the angle (a) between the air-supply position (49) and the neutral position (47) is at most 4°, and/or the angle (a) between the additional position (50) and the neutral position (47) is at most 7°.

13. Motor vehicle seat according to claim 9, wherein the operating element (18) is adjustable between respective positions thereof using a cable pull and is used to fix the static height of the motor vehicle seat.

* * * * *